(12) United States Patent
Sasaki

(10) Patent No.: US 10,018,856 B1
(45) Date of Patent: Jul. 10, 2018

(54) INSECT SCREEN ATTACHED TO SUNGLASSES BY MAGNETS

(71) Applicant: Larry Sasaki, Bossier City, LA (US)

(72) Inventor: Larry Sasaki, Bossier City, LA (US)

( * ) Notice: Subject to any disclaimer, the term of this patent is extended or adjusted under 35 U.S.C. 154(b) by 0 days.

(21) Appl. No.: 15/440,513

(22) Filed: Feb. 23, 2017

(51) Int. Cl.
*G02C 7/10* (2006.01)
*G02C 11/00* (2006.01)
*G02C 5/14* (2006.01)

(52) U.S. Cl.
CPC ............. *G02C 11/00* (2013.01); *G02C 5/14* (2013.01); *G02C 7/10* (2013.01); *G02C 2200/02* (2013.01)

(58) Field of Classification Search
CPC ... G02B 2027/0178; G02C 7/102; G02C 7/16
USPC .......... 351/47, 158, 41; 2/9, 13; 128/206.12, 128/206.24, 205.27
See application file for complete search history.

(56) References Cited

U.S. PATENT DOCUMENTS

| | | | |
|---|---|---|---|
| 1,279,884 A | 9/1918 | Roche | |
| 2,669,717 A | 2/1954 | Diggs | |
| 3,991,753 A * | 11/1976 | Viesca y Viesca | |
| | | | A41D 13/1184 |
| | | | 128/201.12 |
| 4,821,340 A | 4/1989 | Johnson | |
| 4,944,039 A * | 7/1990 | Dietrich | A41D 13/11 |
| | | | 2/13 |
| 6,065,833 A * | 5/2000 | Tiano | A61F 9/029 |
| | | | 2/435 |
| 7,055,521 B1 * | 6/2006 | Johnson | A62B 18/02 |
| | | | 128/200.28 |
| 7,431,453 B2 | 10/2008 | Hogan | |
| 8,919,951 B2 | 12/2014 | Steele | |
| 2015/0346509 A1 | 12/2015 | Walker | |

* cited by examiner

*Primary Examiner* — Hung Dang
(74) *Attorney, Agent, or Firm* — R. Keith Harrison

(57) ABSTRACT

Insect screen assemblies may be configured for attachment to sunglasses having sunglasses frame arms and may include an assembly screen having a plurality of screen openings. A pair of spaced-apart screen attachment devices may include a pair of screen magnets carried by the assembly screen; a pair of sunglasses frame mounts configured for attachment to the sunglasses frame arms, respectively, of the sunglasses; and a pair of frame mount magnets carried by the pair of sunglasses frame mounts, respectively. The pair of screen magnets may magnetically engage the pair of frame mount magnets, respectively, to detachably secure the assembly screen on the sunglasses. Sunglasses with an insect screen assembly are also disclosed.

20 Claims, 10 Drawing Sheets

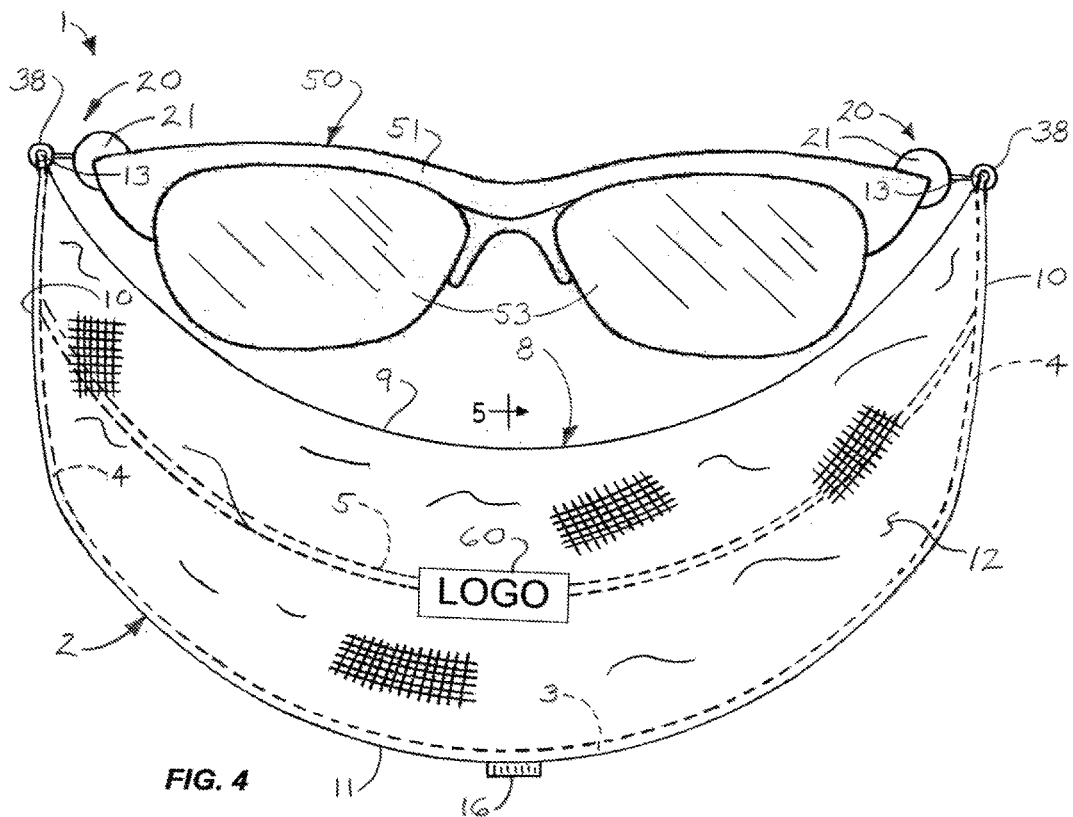
FIG. 4
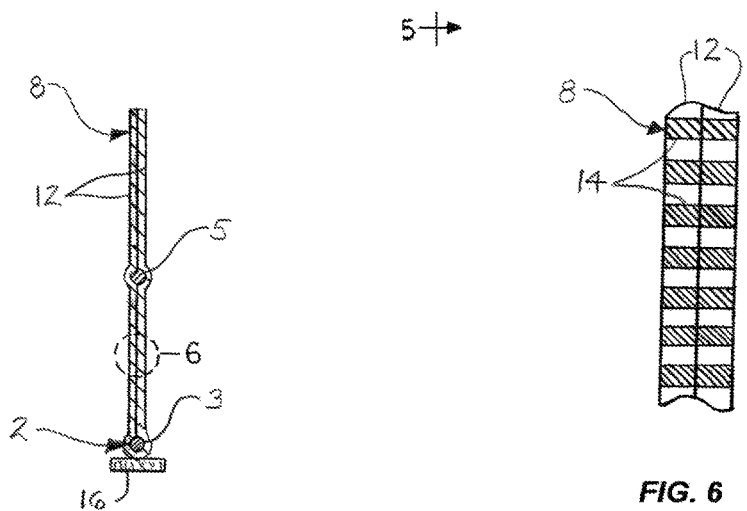
FIG. 5
FIG. 6

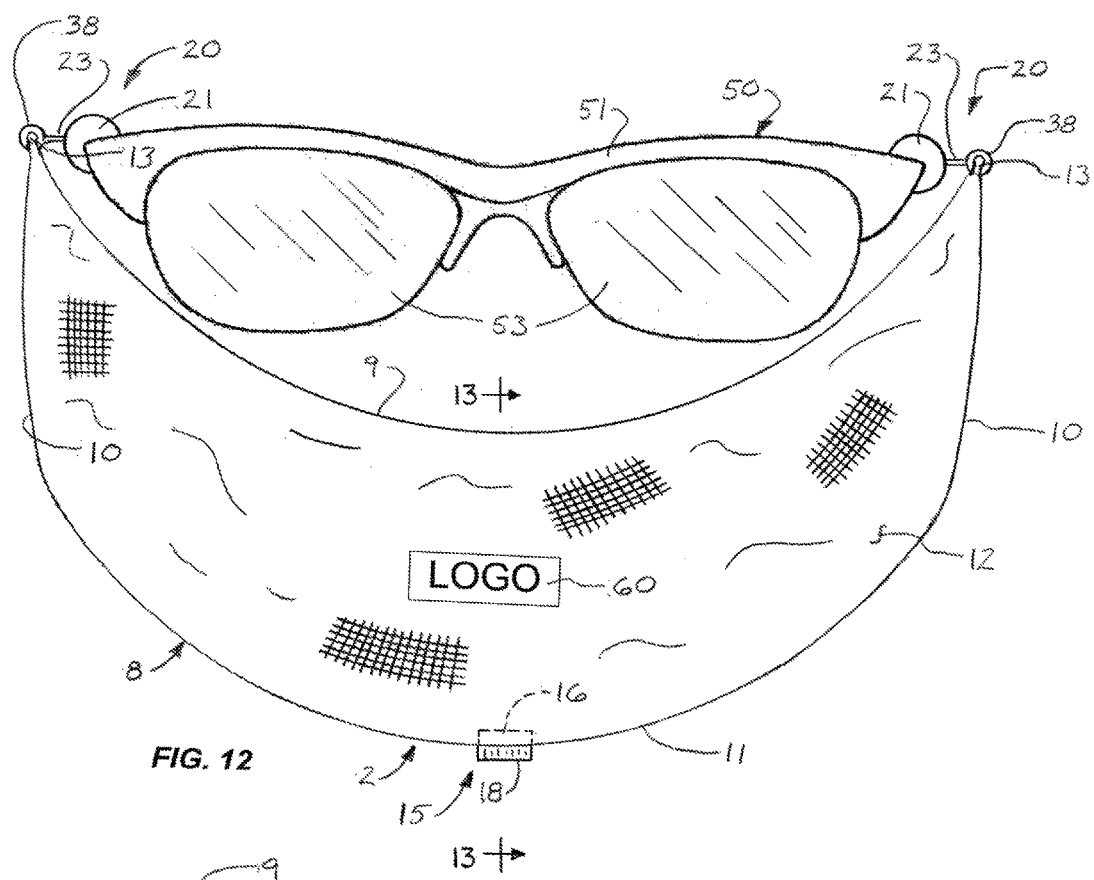
FIG. 12
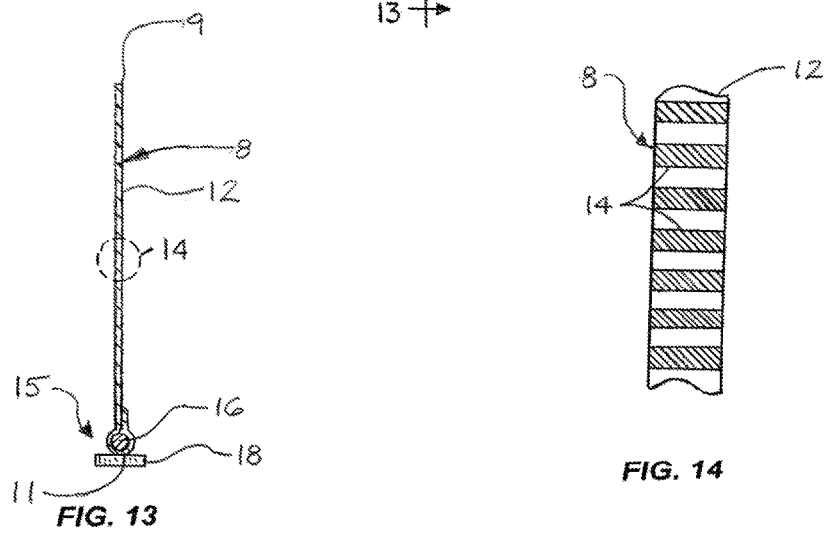
FIG. 13
FIG. 14

US 10,018,856 B1

INSECT SCREEN ATTACHED TO SUNGLASSES BY MAGNETS

FIELD

Illustrative embodiments of the disclosure relate to facial screens which prevent entry of flies or insects into the nose or mouth of a wearer. More particularly, illustrative embodiments of the disclosure relate to insect screen assemblies which can be attached to sunglasses and deployed over the face of a wearer to prevent flies, insects and airborne particles from entering the nose, mouth and ears of the wearer as the wearer rides a bicycle, for example.

SUMMARY

Illustrative embodiments of the disclosure are generally directed to insect screen assemblies which can be attached to sunglasses and deployed over the face of a wearer to prevent flies, insects and airborne particles from entering the nose, mouth and ears of the wearer as the wearer rides a bicycle, for example. An illustrative embodiment of the insect screen assemblies may be configured for attachment to sunglasses having sunglasses frame arms and may include an assembly screen having a plurality of screen openings. A pair of spaced-apart screen attachment devices may include a pair of screen magnets carried by the assembly screen; a pair of sunglasses frame mounts configured for attachment to the sunglasses frame arms, respectively, of the sunglasses; and a pair of frame mount magnets carried by the pair of sunglasses frame mounts, respectively. The pair of screen magnets may magnetically engage the pair of frame mount magnets, respectively, to detachably secure the assembly screen on the sunglasses.

Illustrative embodiments of the disclosure are further generally directed to sunglasses with an insect screen assembly. An illustrative embodiment of the sunglasses includes a sunglasses frame, a pair of sunglasses frame arms carried by the sunglasses frame and a pair of sunglasses lenses carried by the sunglasses frame. An assembly screen may include at least one flexible screen panel layer having a plurality of screen openings. A pair of spaced-apart screen attachment devices may include a pair of screen magnets carried by the assembly screen. A pair of multi-positional screen magnet joints may connect the pair of screen magnets, respectively, to the assembly screen. A pair of sunglasses frame mounts may be attached to the sunglasses frame arms, respectively, of the sunglasses. The pair of sunglasses frame mounts may have a pair of frame mount openings receiving and accommodating the sunglasses frame arms, respectively, of the sunglasses. A pair of frame mount magnets may be carried by the pair of sunglasses frame mounts, respectively. The pair of screen magnets may magnetically engage the pair of frame mount magnets, respectively, to detachably secure the assembly screen on the sunglasses. A pair of multi-positional frame mount magnet joints may connect the pair of frame mount magnets to the pair of sunglasses frame mounts, respectively.

BRIEF DESCRIPTION OF THE DRAWINGS

Illustrative embodiments of the disclosure will now be described, by way of example, with reference to the accompanying drawings, in which:

FIG. 4 is a front view of the illustrative insect screen assembly attached to the sunglasses;

FIG. 5 is a sectional view of a typical assembly screen of the insect screen assembly, taken along section lines 5-5 in FIG. 4;

FIG. 6 is an enlarged sectional view, taken along section line 5 in FIG. 5;

FIG. 12 is a front view of the illustrative insect screen assembly illustrated in FIG. 11, secured to the sunglasses;

FIG. 13 is a sectional view of a typical assembly screen of the insect screen assembly, taken along section lines 13-13 in FIG. 12; and FIG. 14 is an enlarged sectional view, taken along section line 14 in FIG. 13.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 9:
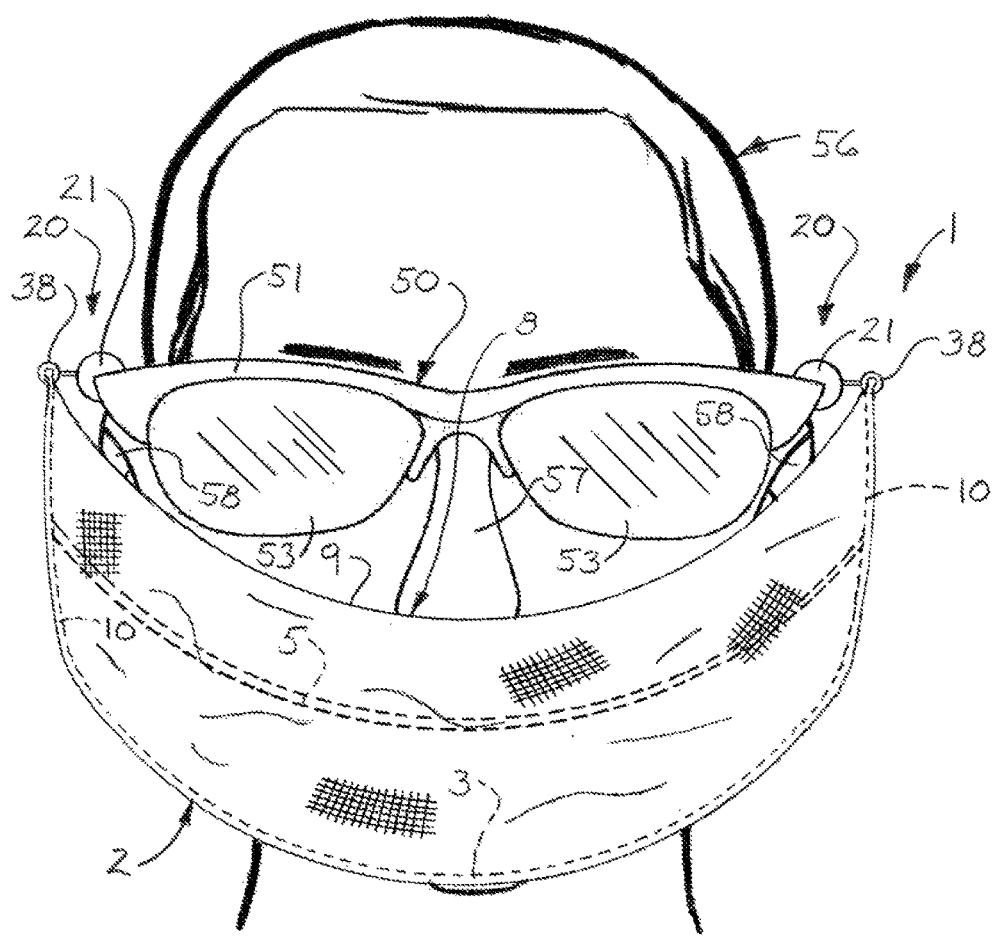
FIG. 9 is a front view of the insect screen assembly secured to the sunglasses and deployed over the nose and mouth of a wearer as the wearer dons the sunglasses.

Referring to the drawings, an illustrative embodiment of the insect screen assemblies is generally indicated by reference numeral 1. As illustrated in FIG. 9, in typical application, which will be hereinafter described, the insect screen assembly 1 may be secured to a pair of sunglasses 50. The sunglasses 50 may be conventional, with a sunglasses frame 51, a pair of sunglasses arms 52 and a pair of sunglasses lenses 53. As a wearer 56 dons the sunglasses 50, the insect screen assembly 1 is deployed over the wearer's face and may substantially cover the nose 57 and mouth (not illustrated) of the wearer 56. The insect screen assembly 1 may additionally cover the ears 58 of the wearer 56. Accordingly, the insect screen assembly 1 may block and prevent flies, insects and airborne particles from entering the nose 57, mouth and ears 58 of the wearer 56, particularly as the wearer 56 rides a bicycle, for example.

The insect screen assembly 1 may include an assembly screen 8. As illustrated in FIG. 6, the assembly screen 8 may include at least one screen panel layer 12 having a plurality of screen openings 14. The assembly screen 8 may include a single screen panel layer 12, or alternatively, multiple laminated or non-laminated screen panel layers 12. In some embodiments, the screen panel layer 12 may have a flexible net or mesh construction and may be fabricated of nylon, polyester and/or other fabric materials which are known by those skilled in the art and suitable for the purpose. In other embodiments, the screen panel layer 12 may have a semi-rigid or rigid plastic or other construction. The screen openings 14 may extend through the screen panel layer 12 in a selected number, spacing and pattern.

Figure 1:
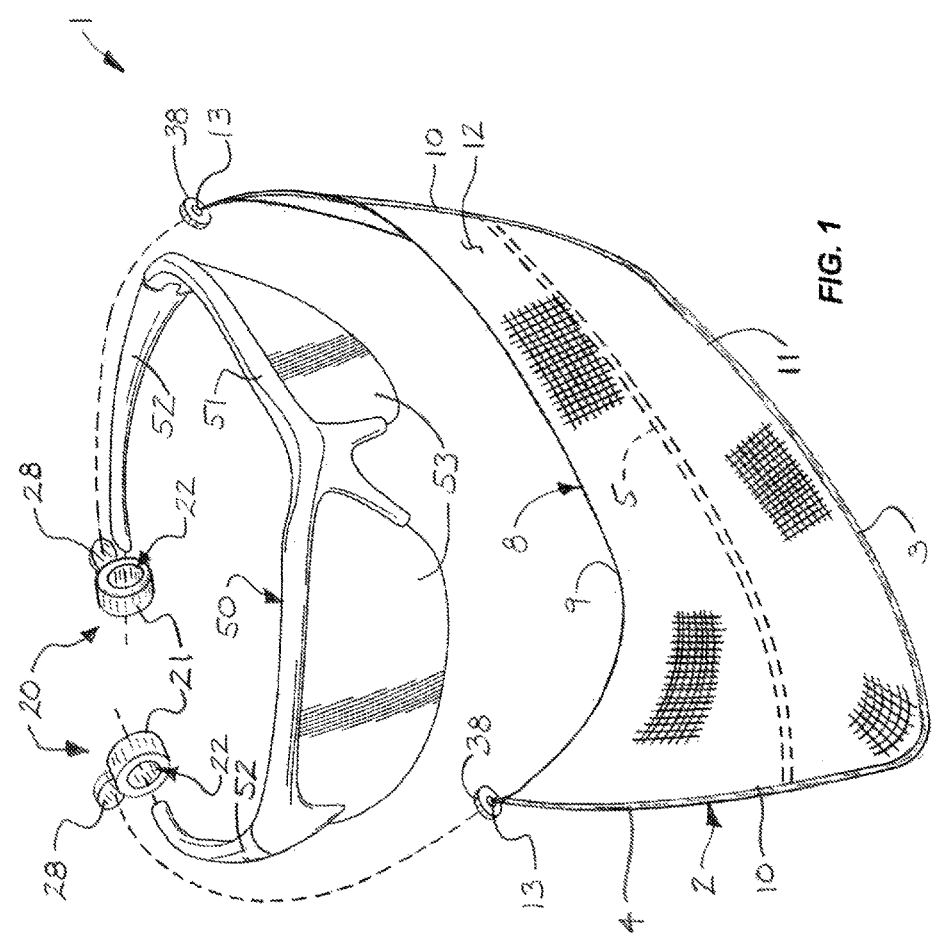
FIG. 1 is an exploded front perspective view of an illustrative embodiment of the insect screen assemblies, more particularly illustrating a typical pair of screen attachment devices for detachably securing the insect screen assemblies on a pair of sunglasses.

As illustrated in FIGS. 1 and 4, the assembly screen 8 may be generally elongated and curved in shape. In some embodiments, the assembly screen 8 may have an upper screen edge 9 which may be generally concave; a pair of spaced-apart side screen edges 10 which may curve downwardly and inwardly toward each other from the upper screen edge 9; and a lower screen edge 11 which may be generally convex. The side screen edges 10 may join the upper screen edge 9 at a pair of upper screen corners 13. In alternative embodiments, the assembly screen 8 may have other shapes. The assembly screen 8 may be suitably sized and configured to substantially cover the nose 57, mouth (not illustrated) and ears 58 of the wearer 56 (FIG. 9) when the insect screen assembly 1 is secured to the sunglasses 50 and the sunglasses 50 are donned by the wearer 56. As illustrated in FIG. 4, in some embodiments, a logo 60 may be printed, stamped and/or otherwise placed on the screen panel layer 12 of the assembly screen 8. The logo 60 may advertise a sports team, school, business or other entity.

In some embodiments, the assembly screen 8 may include an assembly frame 2 which supports the screen panel layer or layers 12. Accordingly, as illustrated in FIGS. 1, 4 and 5, the assembly frame 2 may include a generally elongated lower frame member 3 and a pair of spaced-apart side frame members 4 which extend from the lower frame member 3. The screen panel layer 12 may be attached to the lower frame member 3 at the lower screen edge 11 and to the side frame members 4 at the respective side screen edges 10 of the assembly screen 8 according to the knowledge of those skilled in the art. For example and without limitation, in some embodiments, the screen panel layer 12 may be looped around the lower frame member 3 and the respective side frame members 4 and stitched, sewn or otherwise secured to itself to mount the screen panel layer 12 to the assembly frame 2. In other embodiments, the screen panel layer 12 may be attached to the assembly frame 2 using alternative techniques. As illustrated in FIGS. 1 and 5, in some embodiments, at least one middle frame member 5 may span the side frame members 4 of the assembly frame 2.

Figure 10:
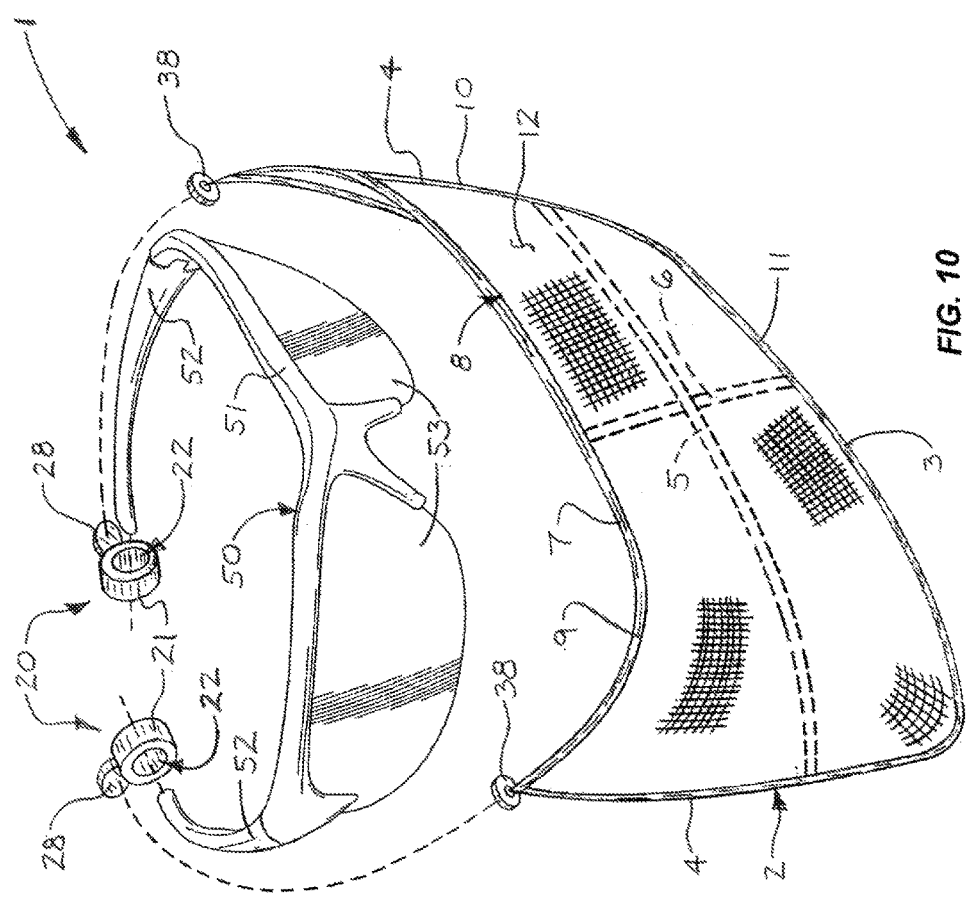
FIG. 10 is an exploded front perspective view of an alternative illustrative embodiment of the insect screen assemblies, detached from the sunglasses.
Figure 11:
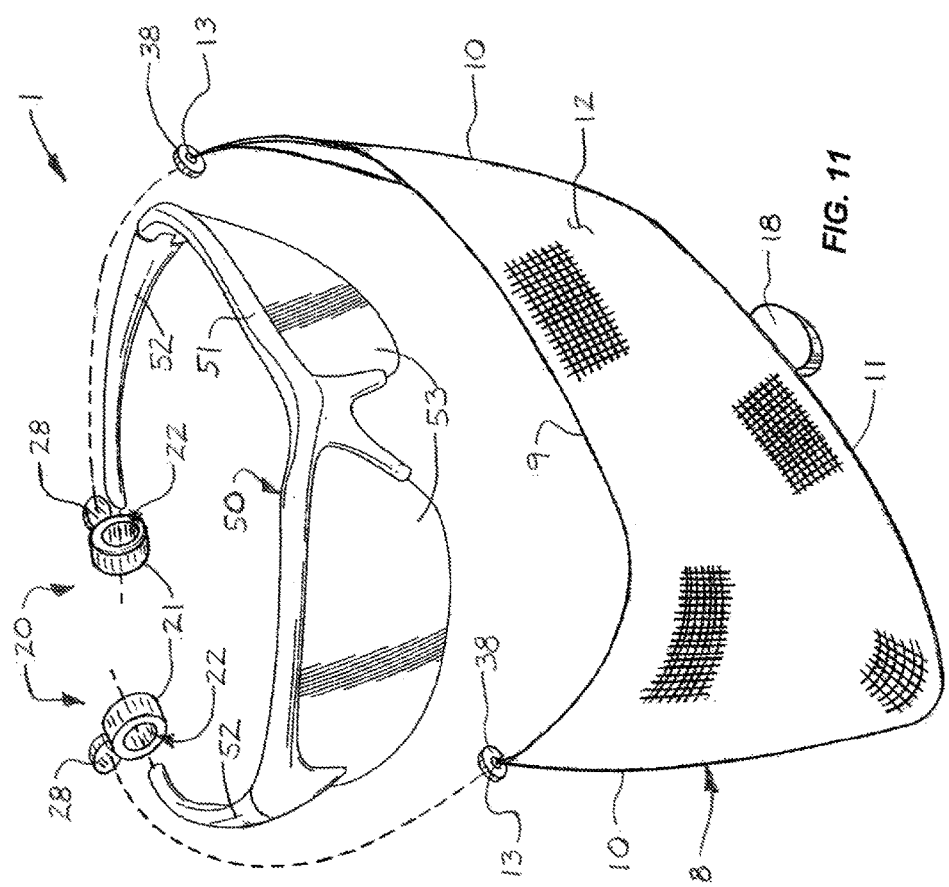
FIG. 11 is an exploded front perspective view of another alternative illustrative embodiment of the insect screen assemblies, detached from the sunglasses.

As illustrated in FIG. 10, in some embodiments, the assembly frame 2 may further include an upper frame member 7 which spans the side frame members 4 in spaced-apart relationship to the lower frame member 3. At least one cross frame member 6 may span the lower frame member 3 and the upper frame member 7 and may intersect the middle frame member 5. Accordingly, the middle frame member 5 and the cross frame member 6 may reinforce and impart structural rigidity to the assembly frame 2 in some embodiments.

As illustrated in FIGS. 11-14 of the drawings, in some embodiments, the assembly frame 2 may be omitted from the assembly screen 8. Accordingly, the assembly screen 8 may include a single screen panel layer 12, as illustrated in FIG. 14. Alternatively, the assembly screen 8 may include multiple, laminated or non-laminated screen panel layers 12, as was heretofore described with respect to FIGS. 5 and 6. As illustrated in FIGS. 12 and 13, in some embodiments, the assembly screen 8 may include a screen weight assembly 15 which maintains the assembly screen 8 deployed in place over the face of the wearer 56 (FIG. 9) by gravity in use of the insect screen assembly 1, as will be hereinafter described. The screen weight assembly 15 may include at least one screen magnet 16 which may be secured in the lower screen edge 11 of the assembly screen 8 according to the knowledge of those skilled in the art. For example and without limitation, in some embodiments, the screen panel layer 12 may be looped around the screen magnet 16 at the lower screen edge 11 and stitched, sewn or otherwise attached to itself on the opposite side, as illustrated in FIG. 13. At least one magnetic screen weight 18 may be magnetically attached to the screen magnet 16. In some embodiments, one or more additional magnetic screen weights 18 may be magnetically attached to each other to impart the desired weight to the assembly screen 8 to maintain deployment of the assembly screen 8 over the nose 57 and mout t of the wearer 56, as illustrated in FIG. 9.

Figure 2:
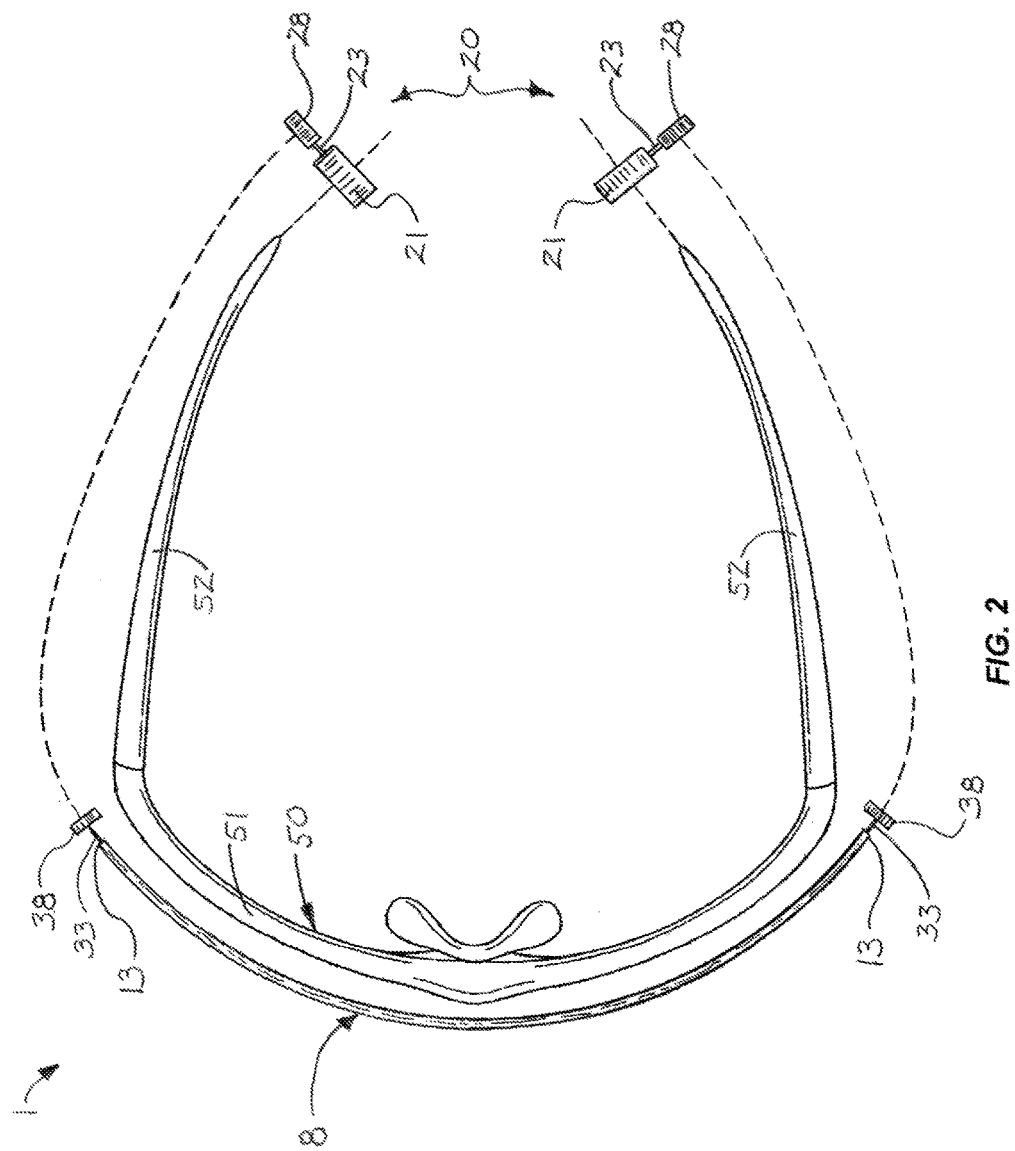
FIG. 2 is an exploded top view of the illustrative insect screen assembly detached from the sunglasses.
Figure 3:
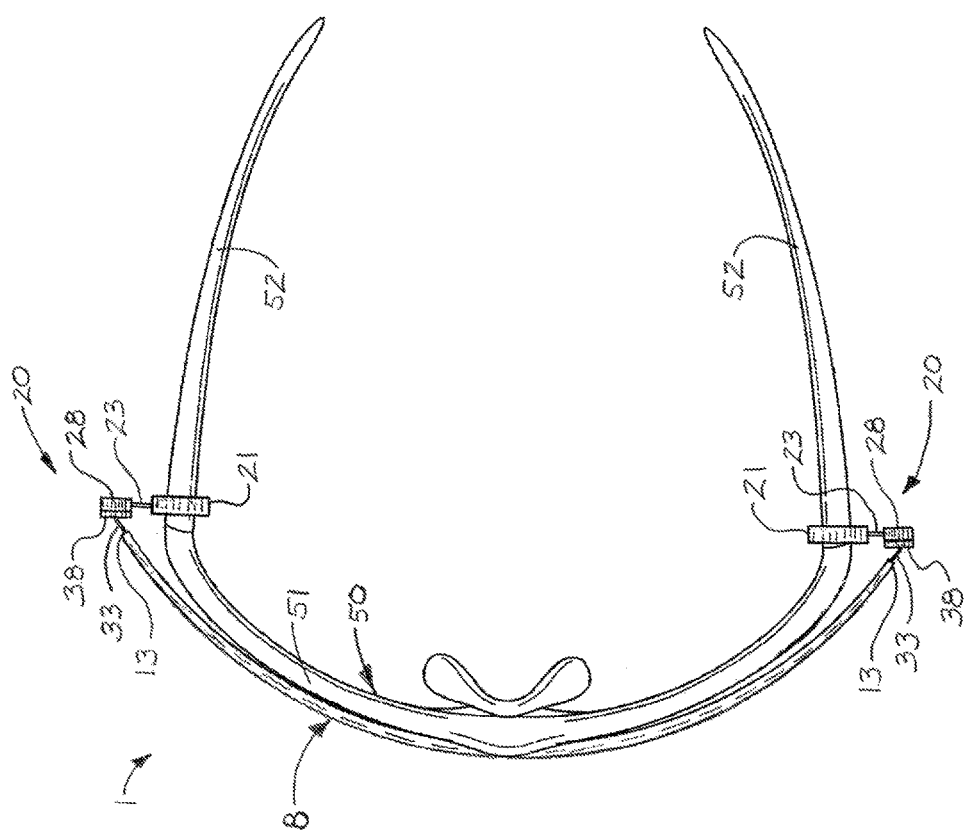
FIG. 3 is a top view of the illustrative insect screen assembly secured to the sunglasses.

As illustrated in FIGS. 1-3, a pair of screen attachment devices 20 may detachably attach the assembly screen 8 to the sunglasses 50. The screen attachment devices 20 may include a pair of sunglasses frame mounts 21. The sunglasses frame mounts 21 may be detachably attached to the respective sunglasses frame arms 52 of the sunglasses frame 51 according to the knowledge of those skilled in the art, as will be hereinafter described. A pair of frame mount magnets 28 may extend from the respective sunglasses frame mounts 21. A pair of screen magnets 38 may be provided on the assembly screen 8. As illustrated in FIGS. 1 and 4, in some embodiments, the screen magnets 38 may be provided at the respective upper screen corners 13 of the assembly screen 8. The screen magnets 38 may be attached to the screen panel layer 12 or to the assembly frame 2 according to the knowledge of those skilled in the art. Accordingly, the screen magnets 38 on the assembly screen 8 may magnetically engage the respective frame mount magnets 28 on the sunglasses frame mounts 21 to detachably secure the assembly screen 8 to the sunglasses frame mounts 21.

The sunglasses frame mounts 21 may be attached to the respective sunglasses frame arms 52 of the sunglasses 50 according to any suitable technique which is known by those skilled in the art. For example and without limitation, in some embodiments, a frame mount opening 22 may extend through the sunglasses frame mount 21. The frame mount opening 22 may be suitably sized and configured to receive and accommodate the corresponding sunglasses frame arm 52. The frame mount magnet 28 may extend from the sunglasses frame mount 21. Accordingly, the sunglasses frame mount 21 can be placed on the sunglasses frame arm 52 by inserting the end of the sunglasses frame arm 52 through the frame mount opening 22 and sliding the sunglasses frame mount 21 forwardly along the sunglasses frame arm 52 until the sunglasses frame mount 21 is disposed just behind the sunglasses frame 51, as illustrated in FIGS. 3 and 4. In other embodiments, each sunglasses frame mount 21 may be attached or secured to the corresponding sunglasses frame 51 using at least one clip, clamp and/or mechanical fastener (not illustrated) which is suitable for the purpose, for example and without limitation.

Figure 7:
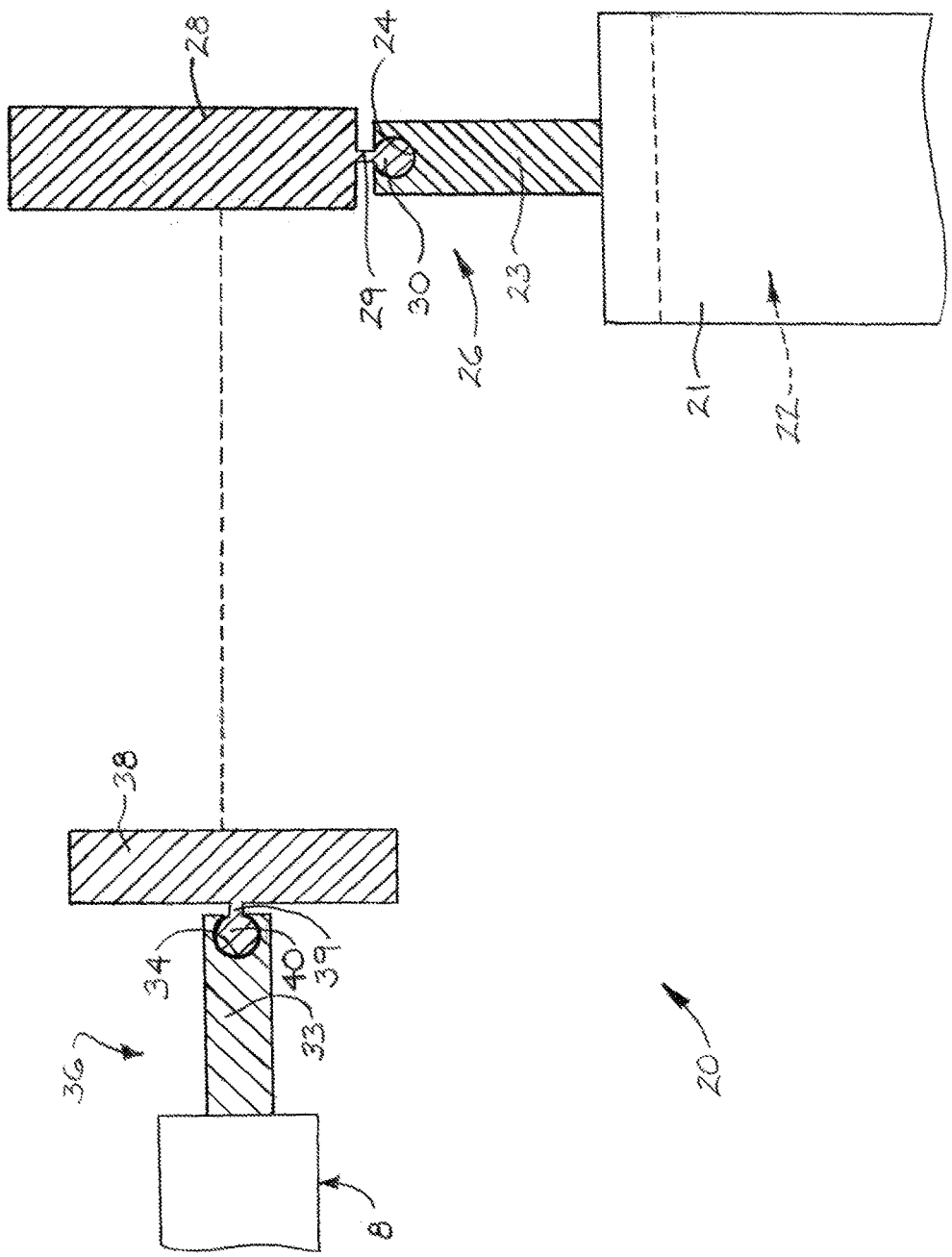
FIG. 7 is an exploded sectional view illustrating a typical screen attachment device suitable for securing the assembly screen of the insect screen assembly to the sunglasses.

In some embodiments, the frame mount magnet 28 may be multi-positional with respect to the sunglasses frame mount 21. Accordingly, as illustrated in FIG. 7, a multi-positional frame mount magnet joint 26 may attach the frame mount magnet 28 to the sunglasses frame mount 21. The multi-positional frame mount magnet joint 26 may include a magnet mount stem 23 which extends from the sunglasses frame mount 21. A ball and socket joint may include a ball socket 24 in the magnet mount stem 23 and a ball 30 inserted in the ball socket 24. The ball 30 may be attached to the frame mount magnet 28 through a ball neck 29. Accordingly, by rotation of the ball 30 in the ball socket 24, the frame mount magnet 28 may be oriented at a desired angle relative to the sunglasses frame mount 21 to facilitate proper alignment or registration and magnetic engagement of the screen magnet 38 with the frame mount magnet 28. As further illustrated in FIG. 7, a multi-positional screen magnet joint 36 may in like manner attach the screen magnet 38 to the assembly screen 8. The screen magnet joint 36 may include a magnet mount stem 33 which extends from the assembly frame 2, or alternatively, the screen panel layer 12 of the assembly screen 8. A ball socket 34 may be provided in the magnet mount stem 33. A ball. 40 may be provided in the ball socket 34. The ball 40 may be attached to the screen magnet 38 through a ball neck 39. Accordingly, by rotation of the ball 40 in the ball socket 34, the screen magnet 38 may be oriented at a desired angle relative to the assembly screen 8 to facilitate magnetic engagement of the screen magnet 38 with the frame mount magnet 28.

Figure 8:
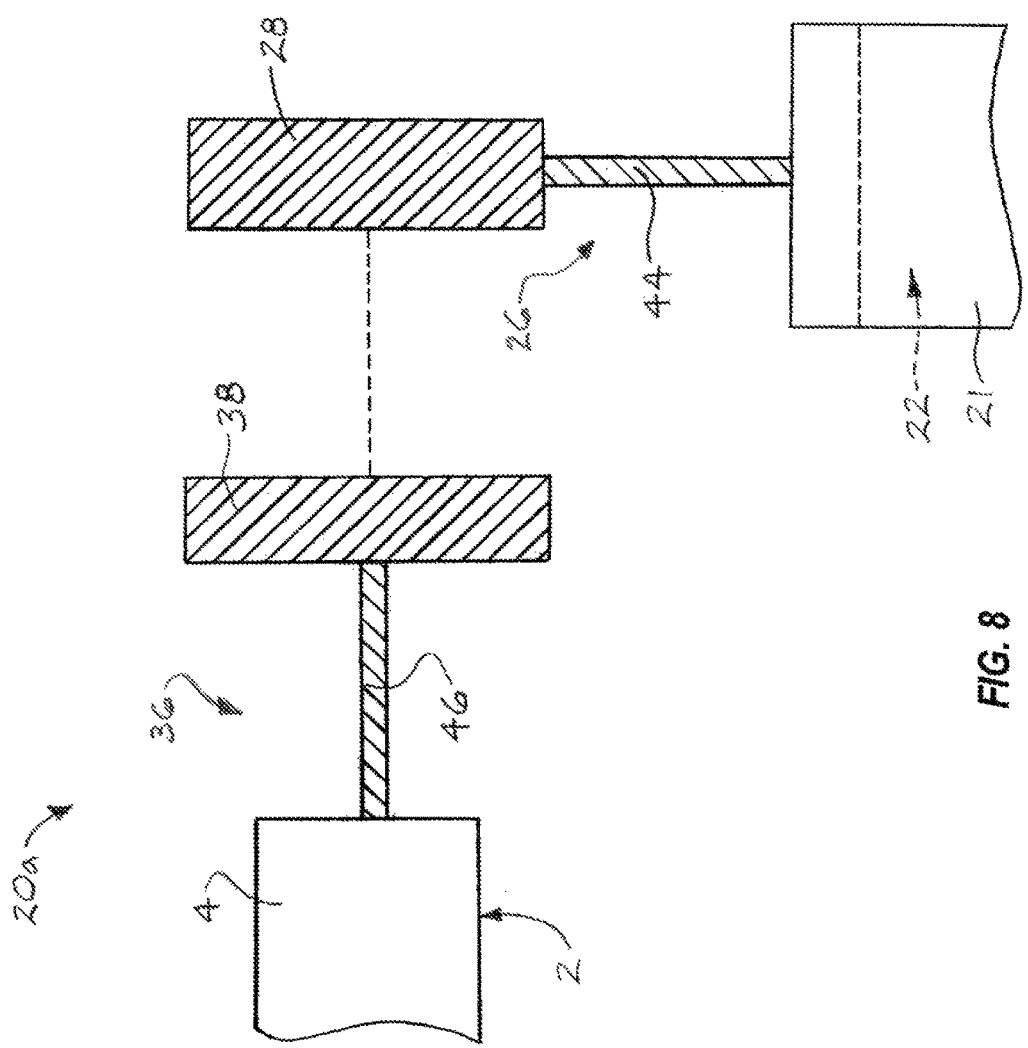
FIG. 8 is an exploded sectional view illustrating an alternative screen attachment device suitable for securing the assembly screen to the sunglasses.

As illustrated in FIG. 8, in some alternative embodiments, the frame mount magnet joint 26 of each screen attachment device 20a may include a magnet mount stem 44 which may include a bendable and pliable wire. Likewise, the screen magnet joint 36 may include a frame magnet stem 46 which may include a bendable and pliable wire. Accordingly, the magnet mount stem 44 can be bended and/or twisted to position the frame mount magnet 28 at a desired orientation, and the frame magnet stem 46 can be likewise bended and/or twisted to position the screen magnet 38 at a desired orientation to facilitate proper alignment and registration for optimal magnetic engagement of the screen magnet 38 with the frame mount magnet 28 in attachment of the assembly screen 8 to the sunglasses 50.

As illustrated in FIGS. 2, 3 and 9, in typical application of the insect screen assembly 1, the assembly screen 8 is attached to the sunglasses 50. Accordingly, the sunglasses frame mounts 21 may be attached to the respective sunglasses frame arms 52 of the sunglasses 50 typically as was heretofore described. The screen magnets 38 may be magnetically engaged with the respective frame mount magnets 28 of the screen attachment devices 20, after which the sunglasses 50 may be donned by the wearer 56 typically in the usual manner. Thus, as illustrated in FIG. 9, the assembly screen 8 is deployed in front of the wearer's face and covers the nose 57, mouth and ears 58 of the wearer 56. As the wearer 56 rides a bicycle, for example, the insect screen assembly 1 may block and prevent flies, insects and airborne particles from entering the nose 57, mouth and ears 58 of the wearer 56.

After use, the screen magnets 38 may be disengaged from the respective frame mount magnets 28, after which the sunglasses frame mounts 21 may be removed from the respective sunglasses frame arms 51 of the sunglasses 50. It will be appreciated by those skilled in the art that the insect screen assembly 1 may require no modification to the sunglasses 50 and serves as an effective way to prevent flies, insects and airborne particles from entering the nose 57, mouth and ears 58 of the wearer 56 during cycling or other outdoor movement.

While certain illustrative embodiments of the disclosure have been described above, it will be recognized and understood that various modifications can be made to the embodiments and the appended claims are intended to cover all such modifications which, may fall within the spirit and scope of the disclosure.

What is claimed is:

1. An insect screen assembly for attachment to sunglasses having sunglasses frame arms, comprising:
    an assembly screen having a plurality of screen openings; and
    a pair of spaced-apart screen attachment devices including:
        a pair of screen magnets carried by the assembly screen;
        a pair of sunglasses frame mounts configured for attachment to the sunglasses frame arms, respectively, of the sunglasses; and
        a pair of frame mount magnets carried by the pair of sunglasses frame mounts, respectively, the pair of screen magnets magnetically engage the pair of frame mount magnets, respectively, to detachably secure the assembly screen on the sunglasses.

2. The insect screen assembly of claim 1 further comprising a pair of frame mount openings, respectively, in the pair of frame mounts, respectively, the pair of frame mount openings configured to receive and accommodate the sunglasses frame arms, respectively, of the sunglasses.

3. The insect screen assembly of claim 1 wherein the assembly screen comprises at least one flexible screen panel layer, and the plurality of screen openings extends through the at least one flexible screen panel layer.

4. The insect screen assembly of claim 3 wherein the at least one flexible screen panel layer comprises a plurality of flexible screen panel layers.

5. The insect screen assembly of claim 1 further comprising a screen weight assembly including at least one screen magnet carried by the assembly screen and at least one magnetic screen weight magnetically attached to the at least one screen magnet.

6. The insect screen assembly of claim 1 wherein the pair of screen attachment devices further comprises a pair of multi-positional frame mount magnet joints connecting the pair of frame mount magnets to the pair of sunglasses frame mounts, respectively.

7. The insect screen assembly of claim 6 wherein the pair of multi-positional frame mount magnet joints comprises a pair of ball and socket joints, respectively.

8. The insect screen assembly of claim 6 wherein the pair of multi-positional frame mount magnet joints comprises a pair of bendable magnet mount stems, respectively.

9. The insect screen assembly of claim 1 wherein the pair of screen attach ent devices further comprises a pair of multi-positional screen magnet joints connecting the pair of screen magnets to the assembly screen.

10. The insect screen assembly of claim 9 wherein the pair of multi-positional screen magnet joints comprises a pair of ball and socket joints, respectively.

11. The insect screen assembly of claim 9 wherein the pair of multi-positional screen magnet joints comprises a pair of bendable frame magnet stems, respectively.

12. An insect screen assembly for attachment to sunglasses having sunglasses frame arms, comprising:
an assembly screen including:
an assembly frame; and
at least one flexible screen panel layer carried by the assembly frame, the at least one screen panel layer having a plurality of screen openings; and
a pair of spaced-apart screen attachment devices including:
a pair of screen magnets carried by the assembly frame of the assembly screen;
a pair of multi-positional screen magnet joints connecting the pair of screen magnets to the assembly frame of the assembly screen;
a pair of sunglasses frame mounts configured for attachment to the sunglasses frame arms, respectively, of the sunglasses;
a pair of frame mount magnets carried by the pair of sunglasses frame mounts, respectively, the pair of screen magnets magnetically engage the pair of frame mount magnets, respectively, to detachably secure the assembly screen on the sunglasses; and
a pair of multi-positional frame mount magnet joints connecting the pair of frame mount magnets to the pair of sunglasses frame mounts, respectively.

13. The insect screen assembly of claim 12 further comprising a pair of frame mount openings, respectively, in the pair of sunglasses frame mounts, respectively, the pair of frame mount openings configured to receive and accommodate the sunglasses frame arms, respectively, of the sunglasses.

14. The insect screen assembly of claim 12 wherein the at least one flexible screen panel layer comprises a plurality of flexible screen panel layers.

15. The insect screen assembly of claim 12 wherein the pair of multi-positional frame mount magnet joints comprises a pair of ball and socket joints, respectively.

16. The insect screen assembly of claim 12 wherein the pair of multi-positional frame mount magnet joints comprises a pair of bendable magnet mount stems, respectively.

17. The insect screen assembly of claim 12 wherein the pair of multi-positional screen magnet joints comprises a pair of ball and socket joints, respectively.

18. The insect screen assembly of claim 12 wherein the pair of multi-positional screen magnet joints comprises a pair of bendable frame magnet stems, respectively.

19. Sunglasses with an insect screen assembly, comprising:
sunglasses including:
a sunglasses frame;
a pair of sunglasses frame arms carried by the sunglasses frame; and
a pair of sunglasses lenses carried by the sunglasses frame;
an assembly screen including at least one flexible screen panel layer, the at least one screen panel layer having a plurality of screen openings; and
a pair of spaced-apart screen attachment devices including:
a pair of screen magnets carried by the assembly screen;
a pair of multi-positional screen magnet joints connecting the pair of screen magnets, respectively, to the assembly screen;
a pair of sunglasses frame mounts attached to the sunglasses frame arms, respectively, of the sunglasses, the pair of sunglasses frame mounts having a pair of frame mount openings receiving and accommodating the sunglasses frame arms, respectively, of the sunglasses;
a pair of frame mount magnets carried by the pair of sunglasses frame mounts, respectively, the pair of screen magnets magnetically engage the pair of frame mount magnets, respectively, to detachably secure the assembly screen on the sunglasses; and
a pair of multi-positional frame mount magnet joints connecting the pair of frame mount magnets to the pair of sunglasses frame mounts, respectively.

20. The sunglasses of claim 19 wherein the assembly screen comprises an assembly frame, and the at least one flexible screen panel is carried by the assembly frame.

* * * * *